(12) United States Patent
Harada et al.

(10) Patent No.: US 8,120,370 B2
(45) Date of Patent: Feb. 21, 2012

(54) CAPACITIVE ELECTROMAGNETIC FLOWMETER

(75) Inventors: Yutaka Harada, Tokyo (JP); Keiji Kanehara, Tokyo (JP); Yoshio Yamazaki, Tokyo (JP)

(73) Assignee: Yamatake Corporation, Toyko (JP)

( * ) Notice: Subject to any disclaimer, the term of this patent is extended or adjusted under 35 U.S.C. 154(b) by 409 days.

(21) Appl. No.: 12/447,510

(22) PCT Filed: Aug. 3, 2007

(86) PCT No.: PCT/JP2007/065261
§ 371 (c)(1),
(2), (4) Date: Apr. 28, 2009

(87) PCT Pub. No.: WO2008/053623
PCT Pub. Date: May 8, 2008

(65) Prior Publication Data
US 2010/0060298 A1   Mar. 11, 2010

(30) Foreign Application Priority Data
Oct. 31, 2006  (JP) ................................ 2006-295727

(51) Int. Cl.
*G01R 27/26* (2006.01)
*G01F 1/58* (2006.01)
(52) U.S. Cl. .................................... 324/658; 73/861.12

(58) Field of Classification Search .................. 324/658; 73/861.08, 861.11, 861.15, 861.7
See application file for complete search history.

(56) References Cited

U.S. PATENT DOCUMENTS
4,631,969 A    12/1986  Schmoock
2010/0011877 A1*  1/2010  Izumi et al. ................. 73/861.12

FOREIGN PATENT DOCUMENTS
JP   56-137024 U    3/1981
JP   08-166266 A    6/1996
JP   08-219834 A    8/1996
JP   2004-354227 A  12/2004

* cited by examiner

*Primary Examiner* — Vincent Q Nguyen
(74) *Attorney, Agent, or Firm* — McDermott Will & Emery LLP

(57) ABSTRACT

The surface of a signal electrode is treated as substrate treatment. An oxide film on the surface of the signal electrode is removed by roughing. The roughened surface is used as a surface treated face. A coating of fluororesin is provided on the surface treated face for lining or thermal welding to the lining material. A signal electrode is provided in the resin lining. Since the oxide film was removed from the surface of the signal electrode for roughening, the adhesive force of the coating of the fluororesin is increased. The fluororesin coating and the resin lining melt each other, and the fluororesin coating is strongly bonded to the resin lining. The adhesion between the signal electrode and the resin lining is increased without opening a hole in the signal electrode. A method uses a primer film formed by substrate treatment on the surface of the signal electrode.

6 Claims, 4 Drawing Sheets

CAPACITIVE ELECTROMAGNETIC FLOWMETER

CROSS REFERENCE TO RELATED APPLICATION

This is a U.S. national phase application under U.S.C. §371 of International Patent Application No. PCT/JP2007/065261 filed Aug. 3, 2007 and claims the benefit of Japanese Application No. 2006-295727, filed Oct. 31, 2006. The International Application was published in Japanese on May 8, 2008 as International Publication No. WO/2008/053623 under PCT Article 21(2) the contents of which are incorporated herein in their entirety.

FIELD OF TECHNOLOGY

The present invention relates to a capacitive electromagnetic flowmeter provided with a signal electrode for electrostatic capacitive coupling with a fluid that flows within a measuring tube.

BACKGROUND OF THE INVENTION

Conventionally, this type of capacitive electromagnetic flowmeter has an excitation coil for producing a magnetic field in a direction that is perpendicular to the direction of flow of the fluid that flows within the measuring tube, and a signal electrode for electrostatic capacitance coupling with a fluid that flows within the measuring tube, provided within the measuring tube, to pick up, through the signal electrode, the electromotive force that is generated in the fluid that flows within the measuring tube due to the magnetic field that is created by the excitation coil. Note that normally a guard electrode for shielding the signal electrode is provided for the signal electrode, and a pair of signal electrodes and the guide electrodes is provided in a direction that is perpendicular to the magnetic field that is produced by the excitation coil.

FIGS. 4A and 4B illustrate the critical portions of a conventional example 1 of a capacitive electromagnetic flowmeter such as proposed in U.S. Pat. No. 4,631,969. In FIGS. 4A and 4B, 1 is a measuring tube, a non-magnetic pipe 2 (such as a stainless steel pipe) having an insulating resin lining 3 on the inner peripheral surface thereof. 4 is a signal electrode, and 5 is a guard electrode for shielding the signal electrode. The signal electrode 4 and the guard electrode 5 are provided in the resin lining 3.

Note that, although not shown in FIGS. 4A and 4B, an excitation coil is provided for producing a magnetic field in a direction that is perpendicular to the direction of flow of a fluid that flows in the measuring tube 1, and two signal electrodes and 4 and guard electrodes 5 are provided facing each other in a direction that is perpendicular to the magnetic field that is produced by the excitation coil.

Illustrated in FIG. 4A and FIG. 4B, typically a fluorine resin is used as the resin lining 3. The fluorine resin has non-stick properties, so the signal electrode 4 may peel from the resin lining 3 due to vibration or by a load such as an external force, because the adhesion between the signal electrode 4 and the resin lining 3 is weak. If the signal electrode 4 were to peel off of the resin lining 3, then there would be a change in the coupling capacitance, which would have an impact on the measurement accuracy. Given this, a plurality of holes 4a is provided in the signal electrode 4, as illustrated in FIG. 5, and the adhesive force between the signal electrode 4 and the resin lining 3 is increased by connecting the resin lining 3 through the holes 4a between the front and back surfaces of the signal electrode 4. This type of structure is proposed in Japanese Utility Model Registration Application S56-137024.

However, in order to increase the adhesiveness of the fluorine resin with most metals in the structure in the second conventional example, set forth above, it is necessary to increase the diameter of the holes 4a that are formed in the signal electrode 4. When the diameter of the holes 4a is increased, then the electrode surface area of the signal electrode 4 is reduced, increasing the electrostatic capacitive impedance of the electrode portion, and thus there is a problem in that the signal is reduced.

The object of the present invention is to provide a capacitive electromagnetic flowmeter capable of increasing the adhesive force between the signal electrode and the resin lining without reducing the electrode area of the signal electrode.

SUMMARY OF THE INVENTION

The capacitive electromagnetic flowmeter as set forth in the present invention, in order to achieve the object set forth above, includes:

a measuring tube wherein an insulating resin lining has been applied to the inner peripheral surface of a non-magnetic pipe;

an excitation coil for producing a magnetic field in a direction that is perpendicular to the direction of flow of a fluid within the measuring tube; and a signal electrode, provided within the resin lining, for electrostatic capacitive coupling with a fluid that flows within the measuring tube, having a surface on which a base treatment has been performed in order to increase the adhesion with the resin lining.

Given the present invention, a base treatment has been performed in order to increase the adhesion of the resin lining to the surface of the signal electrode, so a surface treatment is performed or a primer treatment is performed, or the like, as a base treatment, to thereby increase the adhesion between the signal electrode and the resin lining, to enable the adhesive force between the signal electrode and the resin lining to be increased without reducing the electrode surface area of the signal electrode. Doing so makes it difficult for the signal electrode to be peeled from the resin lining, stabilizing the coupling capacitance, and stabilizing the measurement accuracy as well. Additionally, this prevents the signal from being reduced, as there is no increase in the electrostatic capacitive impedance of the electrode portion.

DETAILED DESCRIPTION OF THE INVENTION

The present invention will be described in detail below based on the drawings.

Figure 1A:
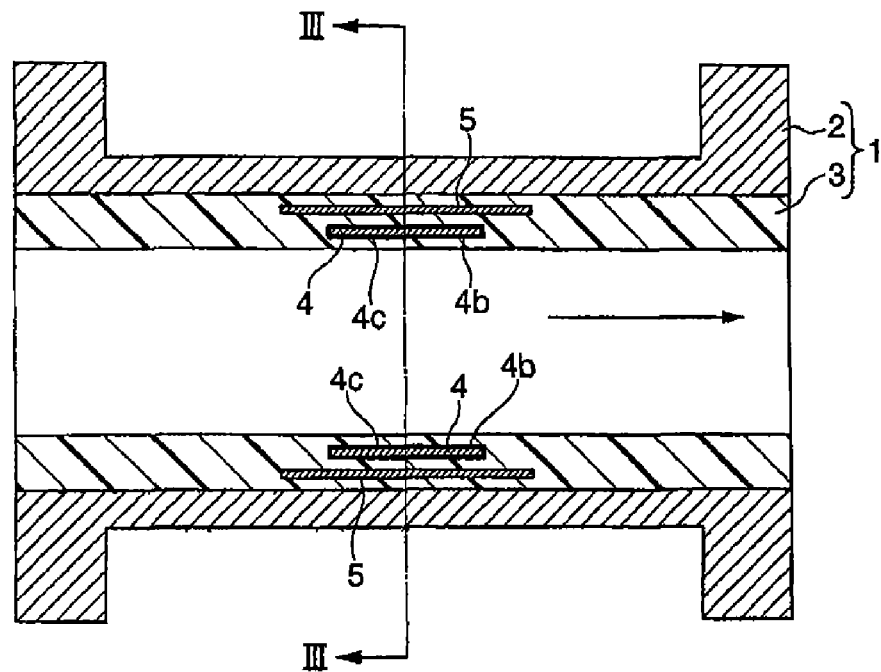
FIG. 1A is a longitudinal sectional diagram of a capacitive electromagnetic flowmeter according to a first example of embodiment according to the present invention.
Figure 1B:
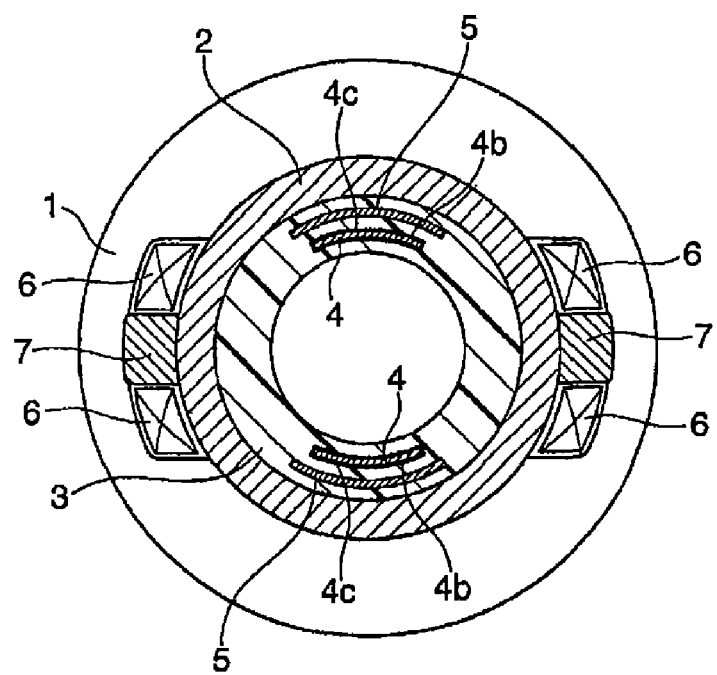
FIG. 1B is a cross-sectional diagram along the section in FIG. 1A.

Example of Embodiment In FIG. 1A and FIG. 1B, 1 is a measuring tube, wherein an insulating resin lining 3 has been applied to the inner peripheral surface of a non-magnetic tube 2, (for example, a stainless steel pipe) 4 is a signal electrode and 5 is a guard electrode for shielding the signal electrode 4. Two sets of signal electrodes 4 and guard electrodes 5 are disposed facing each other within the resin lining 3.

Note that an excitation coil 6 for producing a magnetic field in a direction that is perpendicular to the direction of flow of the fluid that flows within the measuring tube 5 is provided wrapped onto a core 7. The signal electrode 4 and the guard electrode 5 are provided in a direction that is perpendicular to the magnetic field that is produced by the excitation coil 6.

A surface treatment is performed as a base treatment on the surface of the signal electrode 4. Note that the surface of the signal electrode 4 to which the base treatment has been performed is coated with the same material as the resin lining 3. Furthermore, no holes are provided in the signal electrode 4 in order to increase the adhesive force, as was done above. The material for the signal electrode 4 is made from iron, steel, stainless steel, nickel, chrome, aluminum, alloy, or the like.

Figure 2:
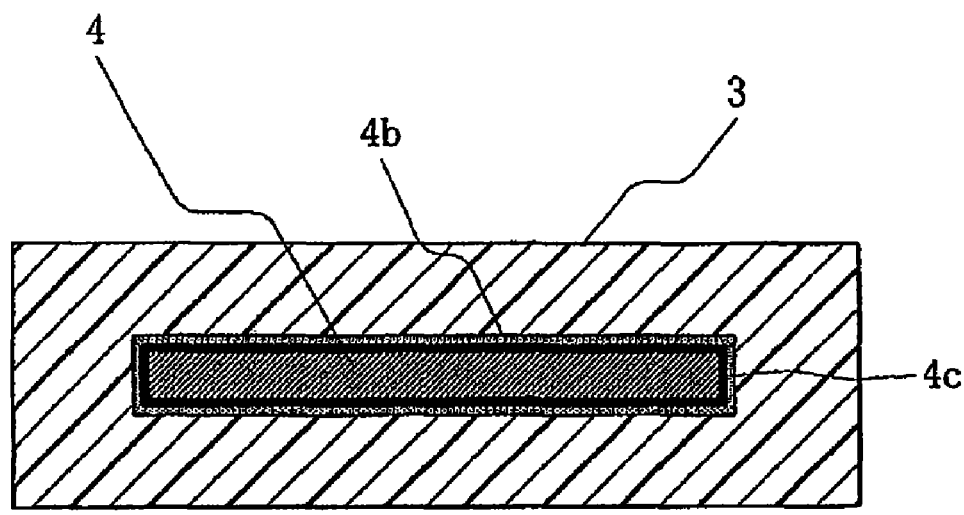
FIG. 2 is a cross-sectional diagram of the resin lining and the signal electrode on which the base treatment has been performed, illustrated in FIG. 1A and FIG. 1B.

A surface treatment in order to create a state of strong adhesion with the resin lining 3 is performed on the surface of the signal electrode 4. In the above example, as this surface treatment, degreasing is performed through an alkali detergent or baking, or the like, the oxide layer is removed from the surface, and a roughing process is performed on the surface to provide indentations and protrusions using a shot blast. Additionally, a fluorine resin is used as the material for the resin lining, and a fluorine resin coating 4c is performed on the surface treated surface 4b of the signal electrode 4. In this case, the fluorine resin is injected into a mold in which the electrode has been inserted (to mold the lining), and the electrode and the fluorine resin lining material are thermally fused to provide the signal electrode 4 within the resin lining 3. FIG. 2 illustrates schematically a layered structure comprising the signal electrode 4, the surface treated surface 4b, the fluorine resin coating 4c, and the resin lining 3.

In the layered structure illustrated in FIG. 2, the layer on the surface of the signal electrode 4 is removed and roughening is performed. Doing so increases the strength of the adhesion of the fluorine resin coating 4c to the signal electrode 4. Additionally, the fluorine resin coating 4c and the resin lining 3 melt into each other, to strongly bond with the resin lining 3. Doing so increases the adhesiveness between the signal electrode 4 and the resin lining 3, to increase the strength of the adhesion between the signal electrode 4 and the resin lining 3.

In this way, in the present example, a structure is obtained wherein the adhesive force between the signal electrode 4 and the resin lining 3 is increased, to make it difficult to peel the signal electrode 4, without reducing the electrode surface area of the signal electrode 4. Doing so stabilizes the coupling capacitance, stabilizing the measurement accuracy. Additionally, there is no reduction in the signal because there is no increase in the electrostatic capacitive impedance in the electrode portion.

Note that the while in the above example of embodiment the surface of the signal electrode 4 was roughened by a shot blast as a surface treatment, instead fine indentations and protrusions may be formed on the surface of the signal electrode 4 through a chemical treatment or through etching. Additionally, various other surface treatments can be considered aside from this method.

Another Example of Embodiment In the example, set forth above, a surface treatment was performed as a base treatment on the surface of the signal electrode 4. In contrast, in the present example of embodiment, in addition to the base treatment on the surface of the signal electrode 4, a layer (a primer layer) is formed to increase the adhesiveness of the resin lining 3. (Hereinafter, the treatment for forming the primer layer shall be termed the "primer treatment.") The fluorine resin coating is performed on the surface of the signal electrode 4 on which the primer treatment has been performed.

Figure 3:
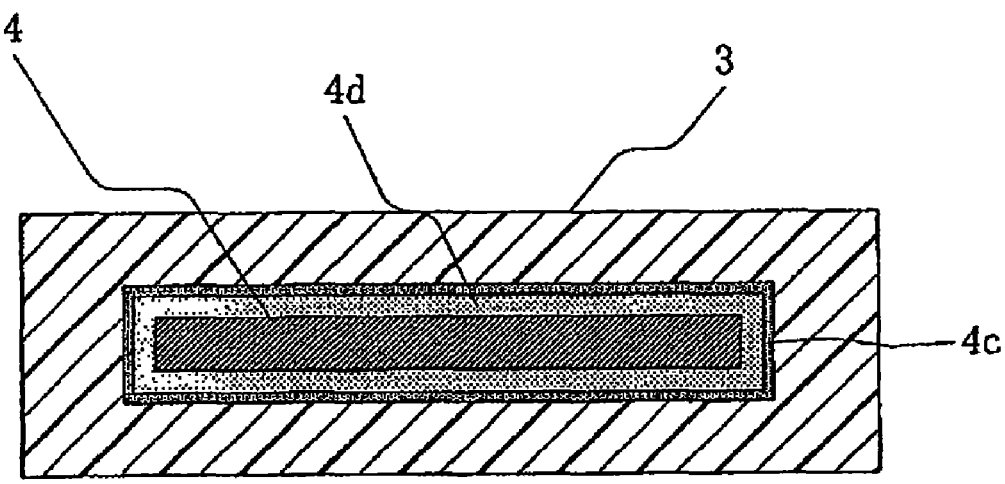
FIG. 3 is a cross-sectional diagram of the resin lining and the signal electrode on which the base treatment has been performed through a second example of embodiment according to the present invention.
Figure 4A:
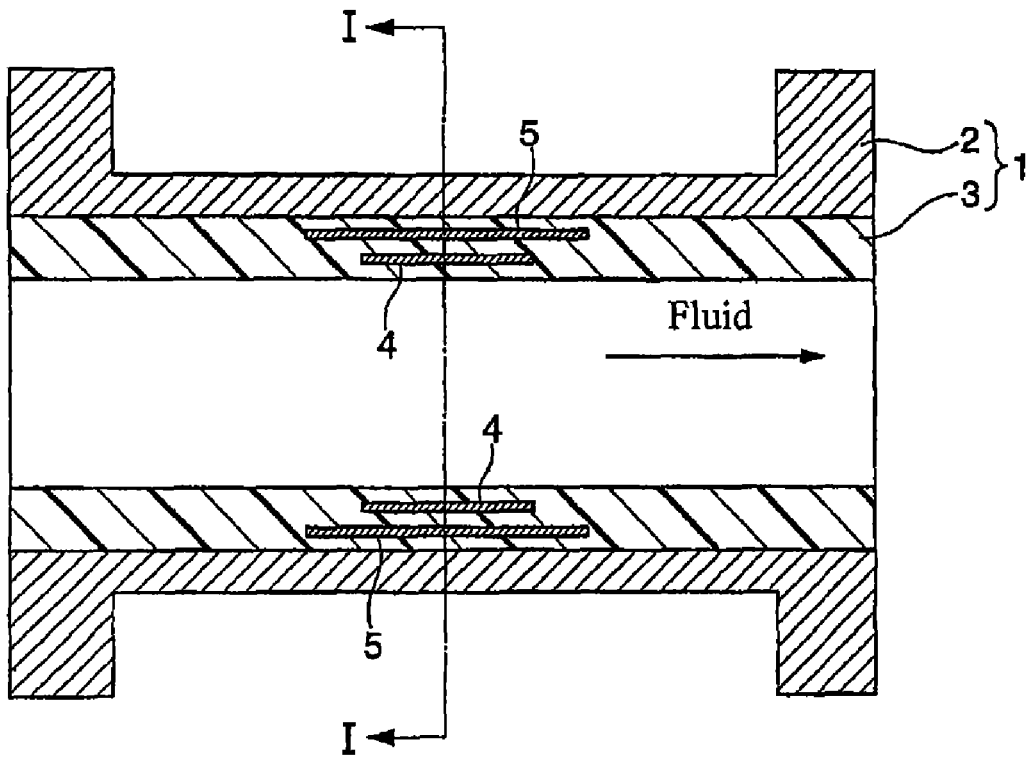
FIG. 4A is a longitudinal sectional diagram of a capacitive electromagnetic flowmeter according to the prior art.
Figure 4B:
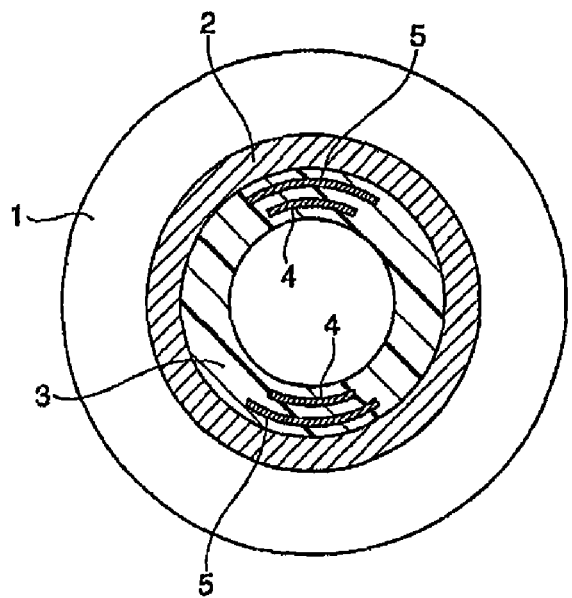
FIG. 4B is a cross-sectional diagram along the section I-I in FIG. 4A.
Figure 5A:
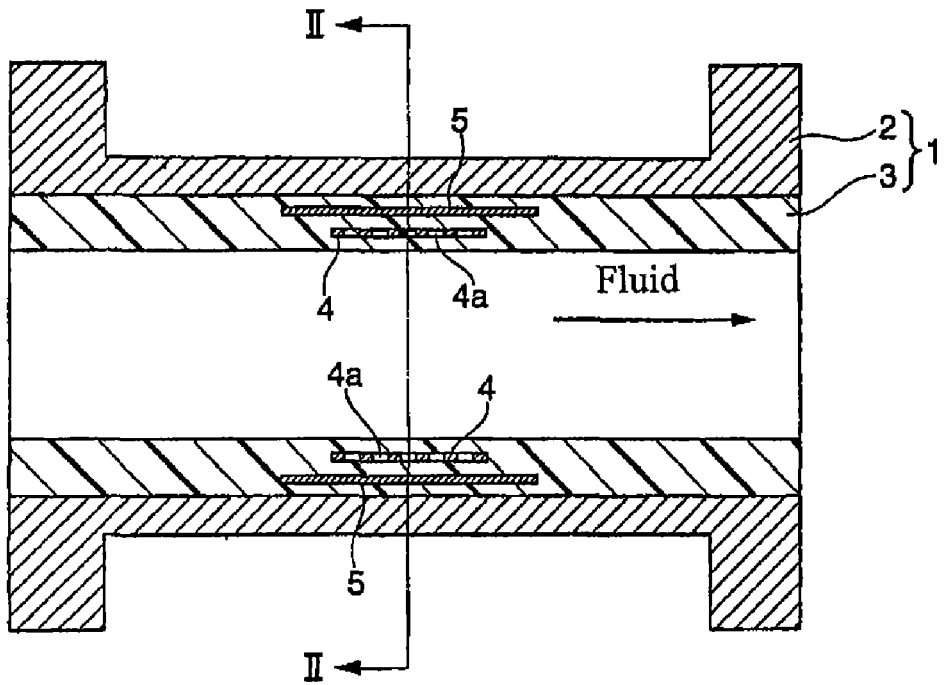
FIG. 5A is a longitudinal sectional diagram of a capacitive electromagnetic flowmeter according to the prior art.
Figure 5B:
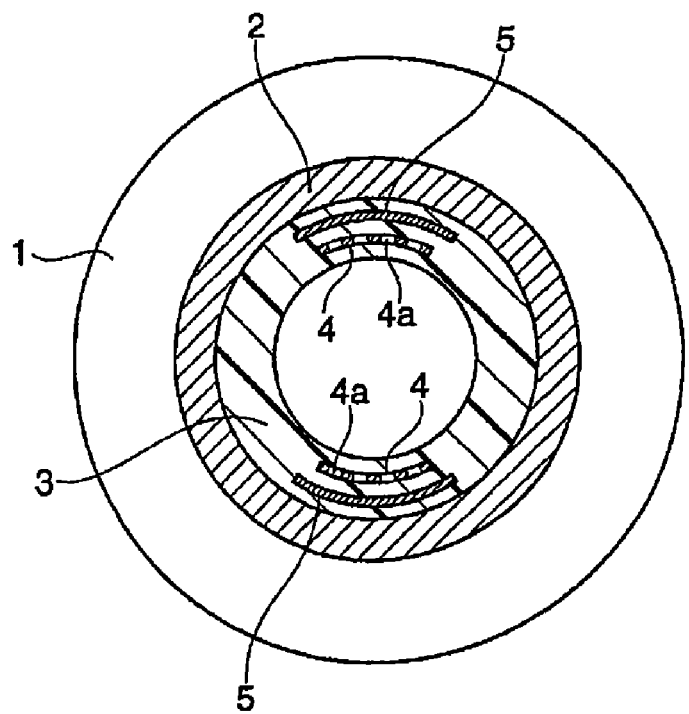
FIG. 5B is a cross-sectional diagram along the section II-II in FIG. 5A.

FIG. 3 illustrates schematically a layered structure comprising the signal electrode 4, the primer layer 4d, the primer resin coating 4c, and the resin lining 3 according to this embodiment. In this example, as the primer layer 4d, a layer is formed that is a mixture of an organic or inorganic adhesive component with a component that is identical to the resin lining or that has adhesiveness, and the fluorine resin coating 4c is performed onto the surface of the primer layer 4d. The lining is formed in this state, and thermal fusion, or the like, is performed with the lining material to provide the signal electrode 4 within the resin lining 3.

In the layered structure illustrated in FIG. 3, the primer layer 4d is positioned between the signal electrode 4 and the resin lining 3, to achieve the role of a bonding agent. The fluorine resin coating 4c that has been performed on the surface of the primer layer 4d melts into the resin lining 3, to strongly bond to the resin lining 3. Doing so increases the adhesiveness between the signal electrode 4 and the resin lining 3, to increase the adhesive strength between the signal electrode 4 and the resin lining 3.

With the present example of embodiment, the adhesive strength between the signal electrode 4 and the resin lining 3 is increased without reducing the electrode surface area of the signal electrode 4. Because of this, the structure is one wherein peeling of the signal electrode 3 is difficult, stabilizing the coupling capacity, stabilizing the measurement accuracy. Additionally, this does not reduce the signal, because there is no increase in the electrostatic capacitive impedance of the electrode portion.

Note that while in the examples set forth above, a fluorine resin coating 4c was performed on the surface of a signal electrode 4 on which a base treatment was performed, the fluorine resin coating 4c may be omitted, and the resin lining 3 and the surface of the signal electrode 4 to which the base treatment has been performed may be bonded directly. For example, it is also possible to perform the lining fabrication and lining material thermal fusing with the base treatment itself depending on the manufacturing environment, or a technique such as vacuum pressurization, or the like, making it possible to strongly bond the resin lining 3 with the surface of the signal electrode 4 on which the base treatment has been performed.

Additionally, while in the examples set forth above, the material for the coating 4c was the same material as for the resin lining 3 (a fluorine resin), the material need not be exactly identical to the resin lining 3, insofar as there is a strong adhesive force with the resin lining 3 through melting together. Furthermore, the resin lining 3 need not necessarily be a fluorine resin.

Additionally, as set forth above, holes for increasing the adhesive strength were not provided in the signal electrode 4, instead holes may be provided in the signal electrode 4 in order to increase the adhesive force. In the above examples of embodiment, the adhesiveness between the signal electrode 4 and the resin lining 3 is increased, so that even if holes are provided in the signal electrode 4 in order to increase the adhesive force, it is possible to get by with a small number of holes. Consequently, it is possible to obtain a strong adhesive force equal to that in the conventional examples, without reducing the surface area of the electrode as much as in the other conventional example.

While in the examples of embodiment set forth above the base treatment was performed on the surface of the signal electrode 4, the same base treatment may be performed on the guard electrode 5.

What is claimed is:

1. A capacitive electromagnetic flow meter, comprising:
   a measuring tube wherein an insulating resin lining has been applied to the inner peripheral surface of a non-magnetic pipe;
   an excitation coil producing a magnetic field in a direction that is perpendicular to the direction of flow of a fluid within the measuring tube; and
   a signal electrode, provided within the resin lining, electrostatic capacitive coupling with the fluid that flows within the measuring tube, having a surface on which a base treatment has been performed in order to increase the adhesion with the resin lining.

2. The capacitive electromagnetic flow meter as set forth in claim 1, wherein:
   the surface of the signal electrode is treated in a state wherein there is high adhesiveness with the resin lining through at least one treatment selected from the group degreasing, oxide layer removal, and surface roughening as a base treatment.

3. The capacitive electromagnetic flow meter as set forth in claim 1, wherein:
   as the base treatment, a layer is formed on the surface of the signal electrode with high adhesiveness with the resin lining.

4. The capacitive electromagnetic flow meter as set forth in claim 1, wherein:
   the surface of the signal electrode on which the base treatment has been performed is coated with a resin.

5. The capacitive electromagnetic flow meter as set forth in claim 4, wherein:
   the resin that is coated onto the surface of the signal electrode to which the base treatment has been performed and the resin lining are the same material.

6. The capacitive electromagnetic flow meter as set forth in claim 4, wherein:
   the resin coated onto the surface of the signal electrode is a fluorine resin.

* * * * *